(12) United States Patent
Lindoff et al.

(10) Patent No.: US 8,155,032 B2
(45) Date of Patent: Apr. 10, 2012

(54) ADAPTIVE SCHEDULING FOR HALF-DUPLEX WIRELESS TERMINALS

(75) Inventors: Bengt Lindoff, Bjärred (SE); William O. Camp, Chapel Hill, NC (US); Sven Mattisson, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 12/255,054

(22) Filed: Oct. 21, 2008

(65) Prior Publication Data

US 2009/0135748 A1 May 28, 2009

Related U.S. Application Data

(60) Provisional application No. 60/988,485, filed on Nov. 16, 2007.

(51) Int. Cl.
*H04L 5/16* (2006.01)
(52) U.S. Cl. ........................ 370/276; 370/296
(58) Field of Classification Search .............. 370/296
See application file for complete search history.

(56) References Cited

U.S. PATENT DOCUMENTS

| | | | |
|---|---|---|---|
| 5,970,056 A * | 10/1999 | Brailean et al. | 370/296 |
| 6,459,687 B1 | 10/2002 | Bourlas et al. | |
| 7,158,503 B1 * | 1/2007 | Kalliojarvi et al. | 370/347 |
| 2002/0021684 A1 | 2/2002 | Toshimitsu et al. | |
| 2002/0058513 A1 | 5/2002 | Klein et al. | |
| 2003/0063597 A1 | 4/2003 | Suzuki | |
| 2004/0077316 A1 * | 4/2004 | Xiong | 455/78 |
| 2004/0077348 A1 * | 4/2004 | Sebire et al. | 455/436 |
| 2004/0174895 A1 | 9/2004 | Hiroaoka et al. | |
| 2004/0228309 A1 | 11/2004 | Marinier | |
| 2005/0100038 A1 * | 5/2005 | Pietraski et al. | 370/437 |
| 2006/0195576 A1 * | 8/2006 | Rinne et al. | 709/226 |
| 2007/0268848 A1 * | 11/2007 | Khandekar et al. | 370/295 |
| 2008/0151797 A1 | 6/2008 | Camp | |
| 2008/0151812 A1 | 6/2008 | Camp, Jr. et al. | |
| 2008/0153429 A1 | 6/2008 | Johnson et al. | |
| 2009/0262699 A1 * | 10/2009 | Wengerter et al. | 370/330 |

FOREIGN PATENT DOCUMENTS

| | | |
|---|---|---|
| EP | 0910188 A1 | 4/1999 |
| EP | 1041845 A1 | 10/2000 |
| EP | 1122895 A1 | 8/2001 |
| EP | 1227602 A1 | 7/2002 |
| WO | 2004/004244 A1 | 1/2004 |
| WO | 2004/107605 A1 | 12/2004 |

\* cited by examiner

*Primary Examiner* — Brandon Renner
*Assistant Examiner* — Stephen J Clawson
(74) *Attorney, Agent, or Firm* — Coats & Bennett, P.L.L.C.

(57) ABSTRACT

Adaptation is introduced into allocation of uplink and downlink subframes in wireless communication systems that support full-duplex and half-duplex mobile terminals, thus reducing interference between mobile terminals. In an exemplary method for allocating uplink and downlink timeslots in a wireless communication system supporting full-duplex and half-duplex mobile terminals, a base station determines that a mobile terminal is capable of only half-duplex operation and allocates one or more uplink subframes and one or more downlink subframes to the first mobile terminal, for each of a plurality of frames, so that none of the allocated uplink subframes overlaps in time with an allocated downlink subframe. The allocation of uplink subframes and downlink subframes is varied between consecutive ones in at least a first series of frames according to a pre-determined pattern. In some embodiments, the method further includes transmitting an allocation message to the first mobile terminal, designating the pre-determined pattern.

6 Claims, 7 Drawing Sheets

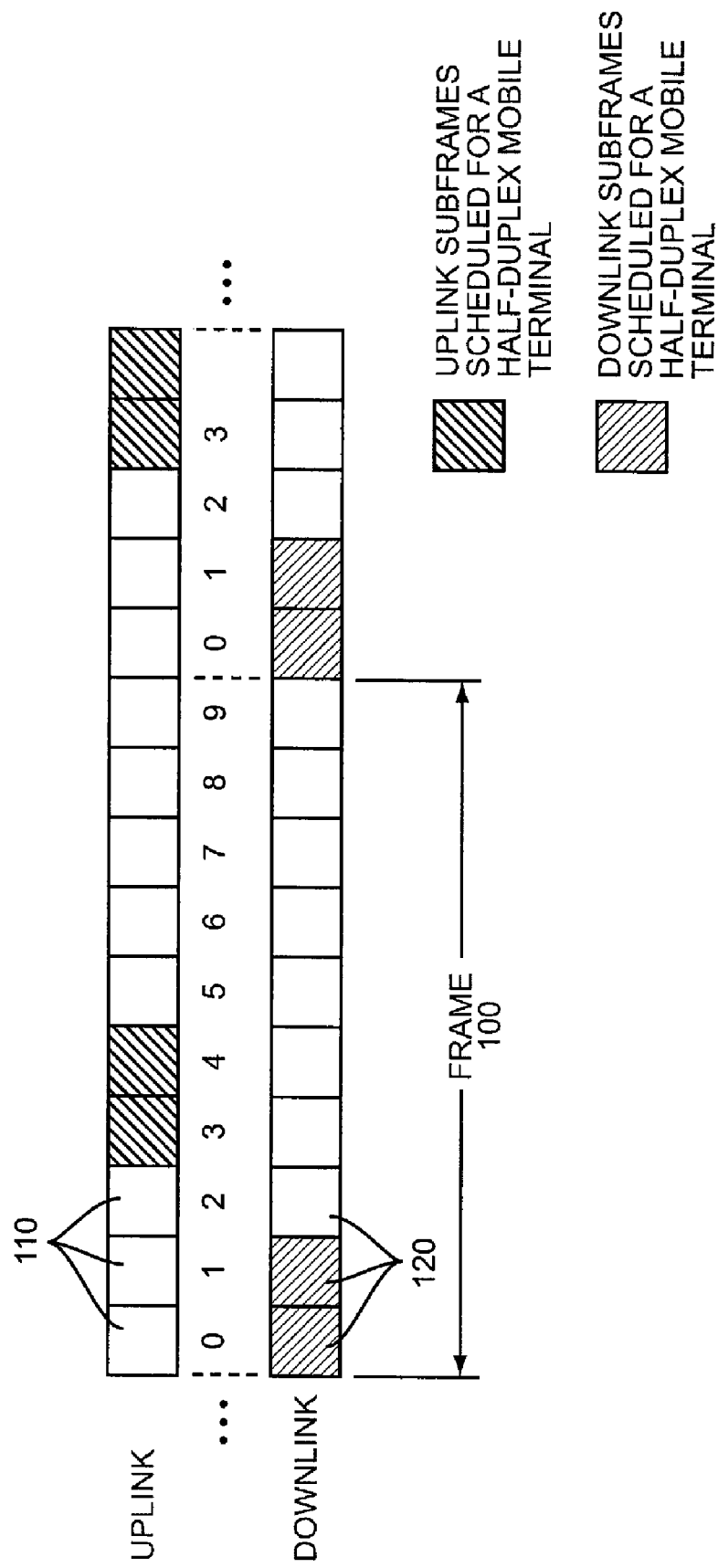

ADAPTIVE SCHEDULING FOR HALF-DUPLEX WIRELESS TERMINALS

CROSS-REFERENCE TO RELATED APPLICATIONS

This application claims priority under 35 U.S.C. §119(e) to provisional patent application Ser. No. 60/988,485, filed Nov. 16, 2007 and entitled "Adapting UL/DL Allocation for Half-Duplex Terminals," the entire contents of which are incorporated by reference herein.

TECHNICAL FIELD

The present invention relates to telecommunication systems, in particular to methods and apparatus for adaptively allocating radio link resources for half-duplex user terminals.

BACKGROUND

With the proliferation of wireless communications standards and frequency bands, future mobile terminals will often support several frequency bands as well as several cellular system standards. One cost- and size-effective approach for a mobile terminal (a User Equipment, or UE, in the parlance of the $3^{rd}$-Generation Partnership Project, or 3GPP) to support a number of frequency bands is to permit only half-duplex operation in one or more of the frequency bands. Half-duplex operation means that the mobile terminal does not support simultaneous transmission and reception, meaning that a large duplex filter is not needed. Duplex filters generally also cause a significant signal power loss; hence, half-duplex operation also provides benefits in terms of mobile terminal power consumption, especially at high output powers.

FIG. 1 shows an example of half-duplex operation in a system that supports both full-duplex operation, such as 3GPP's Long Term Evolution (LTE) system. With the pictured allocation of uplink and downlink resources, the scheduled mobile terminal operates in half-duplex operation (i.e., no simultaneous reception and transmission) even though the uplink and downlink resources are in distinct frequency bands. In this example a mobile terminal is scheduled to receive data in two downlink subframes 120, i.e., the subframes numbered "0" and "1", and to transmit data in two uplink subframes 110, i.e., the subframes numbered "3" and "4." In the pictured example, the allocation of resources in the first frame 100 (comprising ten uplink subframes 120 and ten downlink subframes 110) is repeated in the subsequent frame. The scheduled uplink and downlink subframes do not overlap; thus, the scheduled mobile terminal can operate in half-duplex mode, using a duplexing switch rather than an expensive and bulky duplex filter.

Although half-duplex operation provides advantages in cost and size, one drawback is that maximum allowed throughput is reduced, because fewer than all subframes may be allocated to the uplink and/or the downlink at a given time. However, for LTE and future cellular systems supporting data rates up to and above 100 MB/s, half-duplex terminals may still reach high data rates (e.g., greater than 20 Mb/s).

As noted above, duplex filters introduce front-end power loss and may increase the power consumption of a mobile terminal. However, duplex filters also provide some benefits other than simply allowing simultaneous transmission (TX) and reception (RX). A primary effect of the filter is to reduce the transmitter power that leaks into the mobile terminal's receiver. Without the filter, the energy from the transmitter is likely to desensitize a simultaneously operating receiver circuit. However, the filter also reduces terminal-to-terminal interference, especially in systems using frequency plans in which the frequency duplex distance (i.e., the separation between transmit and receive frequencies) is small relative to the system bandwidth. One example is the 700 MHz band, currently planned for use in future cellular systems, especially in the United States. In the 700 MHz band, the system bandwidth is around 5 MHz, with a duplex distance of only 10-15 MHz. Especially in these systems, the transmitter noise power in the receive band can be at a high level before it is attenuated by a duplex filter.

FIG. 2 illustrates a scenario in which the benefits of having a duplex filter are demonstrated. As shown in FIG. 2A, mobile terminals 220 and 230, designated MT1 and MT2, respectively, are situated close to one another (e.g., one meter apart) and are communicating with a distant base station 210. Thus, the output power transmitted by mobile terminal MT1 is relatively high (e.g., 20 dBm), as shown in FIG. 2B, while the signal received at mobile terminal MT2 from the base station is relatively low (e.g., −90 dBm), as shown in FIG. 2D. In this case, mobile terminal MT1 is transmitting at the same time that mobile terminal MT2 is receiving.

As shown in FIG. 2B, the output power spectrum from transmitting mobile terminal MT1 is at its peak at the designated transmit frequency $f_{TX}$. Although the power spectral density rolls off outside of the transmit frequency band, considerable transmit energy is still present in the receive frequency band, centered at $f_{RX}$. In FIG. 2B, the transmit power in the receive band (prior to filtering, if any) is −20 dBm, 40 dB below the transmit band power level. As shown in FIG. 2C, the duplex filter in mobile terminal MT1 suppresses the out-of-band emissions resulting from mobile terminal MT1's transmission; in the pictured example, the filter provides 45 dB of rejection for receive-band emissions from the transmitter circuitry. Thus, the transmitted power in the receive band is at approximately −65 dBm.

In the scenario pictured in FIG. 2A, the coupling loss between the two mobile terminals 220 and 230 might be as low as 40 dB, for example. In this case, then, the noise floor at the input of the receiver for mobile terminal MT2, resulting from receive-band emissions from mobile terminal MT1, is 20 dBm−40 dB−45 dB=−105 dBm, well below the received signal level for the desired signal from base station 210 (at −90 dBm). This is illustrated in FIG. 2D.

FIGS. 3A-3C illustrate a similar scenario, except that FIG. 3A depicts two half-duplex mobile terminals 320 and 330, respectively designated MT3 and MT4. Unlike the mobile terminals in FIG. 2, these mobile terminals have no duplex filters. In this case, the lack of a duplex filter makes the noise floor 45 dB higher than in the scenario pictured in FIG. 2, implying, given the same conditions discussed above, a noise floor at the receiver of mobile terminal MT4 of around −60 dBm, as pictured in FIG. 3C. Because this is 30 dB higher than the received signal level of −90 dBm, mobile terminal MT4 will not be able to receive and decode the signal from the base station 210. If the interference persists, mobile terminal MT4 will eventually lose synchronization with base station 210.

Those skilled in the art will appreciate that the coupling loss is increased if mobile terminals MT3 and MT4 are separated by a larger distance, thus reducing the interference. However, the coupling loss increases quite slowly, i.e., by about 12 dB for each doubling of the distance. Hence, increasing the distance to four meters results in a coupling loss approximately 24 dB higher. However, at this distance the noise floor is at −84 dBm for the conditions described above, still well above the received signal level.

SUMMARY

In various embodiments of the present invention, adaptation is introduced into allocation of uplink and downlink subframes in wireless communication systems that support full-duplex and half-duplex mobile terminals. With this adaptation, the risk of interference from uplink transmissions of one mobile terminal colliding with downlink transmissions to another mobile terminal may be reduced, thus improving the average reception quality. The adaptation may be performed in several ways, such as by introducing a dynamic uplink/downlink subframe allocation such that the allocation changes for each frame in a series of frames according to a pre-determined pattern, where each frame comprises two or more subframes that are independently allocable to one or more mobile terminals. In some embodiments, a first allocation of uplink and downlink subframes, which may be a fixed allocation or a pattern of varying allocations, may be altered in response to an interference problem detected by a mobile terminal. In others, a first allocation of uplink and downlink subframes may be altered in response to an interference problem detected or predicted by a serving base station.

In some embodiments, a pattern of uplink and downlink subframe allocations is selected for a particular combination of downlink and uplink resource quantities, so that the allocation of subframes from one frame to the next defines a "hopping" pattern, in which one or more of the uplink and/or downlink subframes are shifted to different positions between successive frames according to a well defined pattern. This pattern, or an indicator designating this pattern, is signaled to mobile terminal. In some embodiments, only downlink subframes or only uplink subframes are re-allocated between frames, while in others, both are reallocated between frames.

In other embodiments of the invention, a mobile terminal is connected to the network using a particular uplink/downlink subframe allocation, which may be fixed between successive frames or vary according to a pre-determined pattern. In response to detecting a downlink quality problem, the mobile terminal in some of these embodiments may request a new uplink and downlink subframe allocation. In response, the network changes the uplink/downlink subframe allocation. In still other embodiments, a mobile terminal is again connected to the network using a particular uplink/downlink subframe allocation, which may be fixed between successive frames or vary according to a pre-determined pattern. In these embodiments, the network detects or predicts a quality problem in the connection to the half-duplex terminal, and in response signals a new uplink/downlink subframe allocation to the terminal. The connection continues using the new uplink/downlink subframe allocation.

An exemplary method for allocating uplink and downlink timeslots in a wireless communication system supporting full-duplex and half-duplex mobile terminals thus includes determining that a first mobile terminal is capable of only half-duplex operation, and allocating one or more uplink subframes and one or more downlink subframes to the first mobile terminal, for each of a plurality of frames, so that none of the allocated uplink subframes overlaps in time with any of the allocated downlink subframes. The method further includes varying the allocation of uplink subframes and downlink subframes to the first mobile terminal between consecutive ones in at least a first series of frames according to a pre-determined pattern. In some embodiments, the method further includes transmitting an allocation message to the first mobile terminal, designating the pre-determined pattern; this allocation message may designate one of a plurality of pre-determined patterns "known" to the mobile terminal, in some embodiments. In some embodiments, the allocation may further indicate a starting position in the pre-determined pattern.

Variations of the above-described methods are also disclosed in the following description, including embodiments in which a fixed allotment of uplink subframes and downlink subframes is varied in response to detecting that excessive interference has occurred or is likely to occur in a mobile terminal; this detection may occur at the mobile terminal itself or at a serving base station. Various apparatus are also disclosed, including mobile terminals and base stations configured according to the above-described methods. Of course, those skilled in the art skilled in the art will appreciate that the present invention is not limited to the above features, advantages, contexts or examples, and will recognize additional features and advantages upon reading the following detailed description and upon viewing the accompanying drawings.

BRIEF DESCRIPTION OF THE DRAWINGS

FIG. 1 illustrates an allocation of uplink and downlink subframes for a half-duplex mobile terminal operating in a wireless communication system supporting full-duplex operation.

DETAILED DESCRIPTION

Figure 2B:
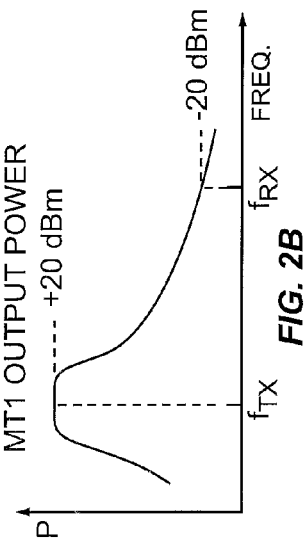
FIGS. 2A-2D illustrate an out-of-band interference scenario for mobile terminals having duplex filters.
Figure 2C:
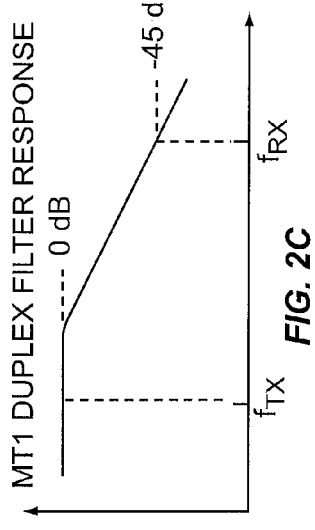
Figure 2D:
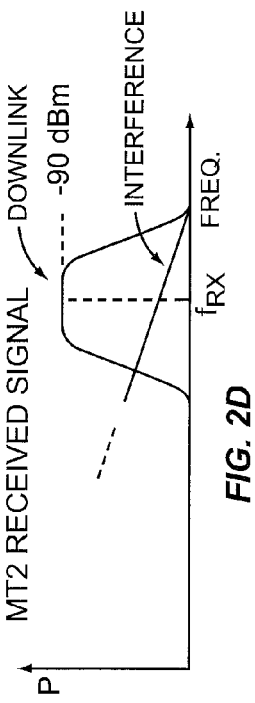
Figure 2A:
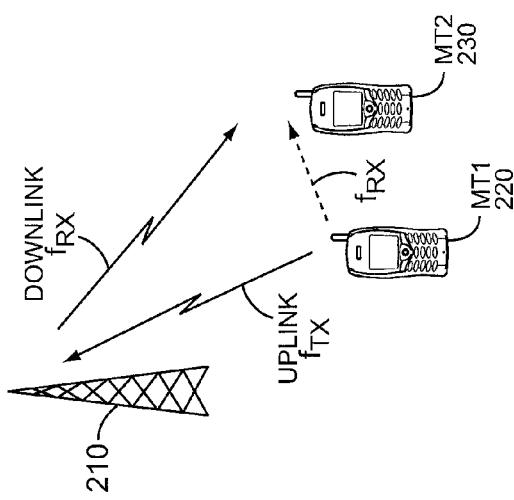
Figure 3B:
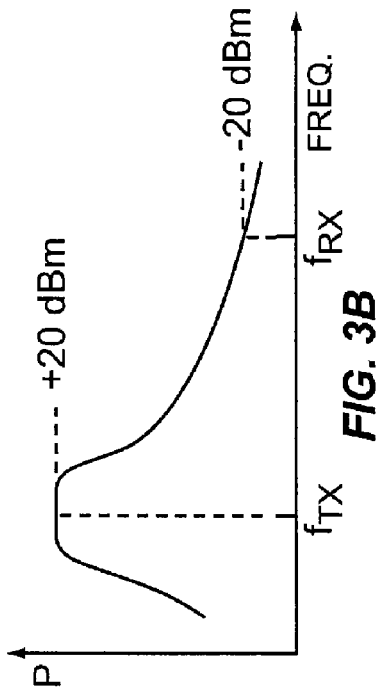
FIGS. 3A-3C illustrate an out-of-band interference scenario for mobile terminals without duplex filters.
Figure 3C:
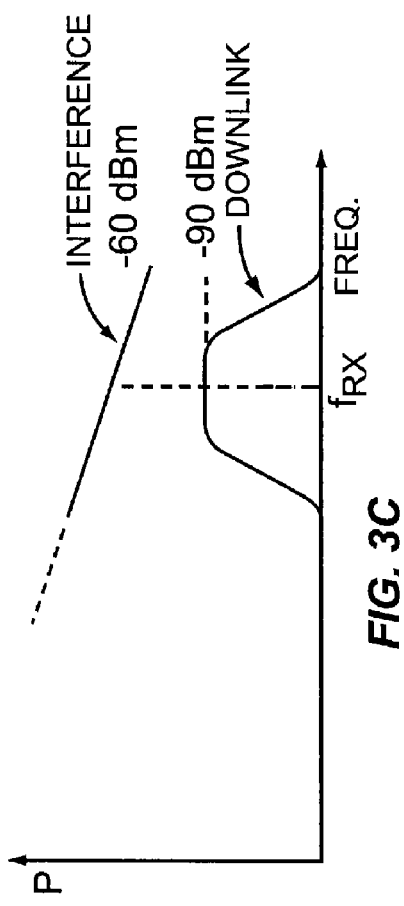
Figure 3A:
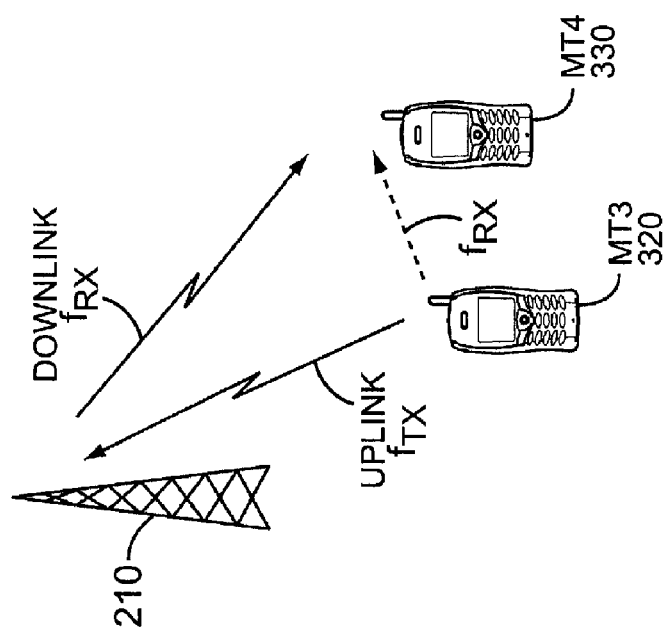
Figure 4:
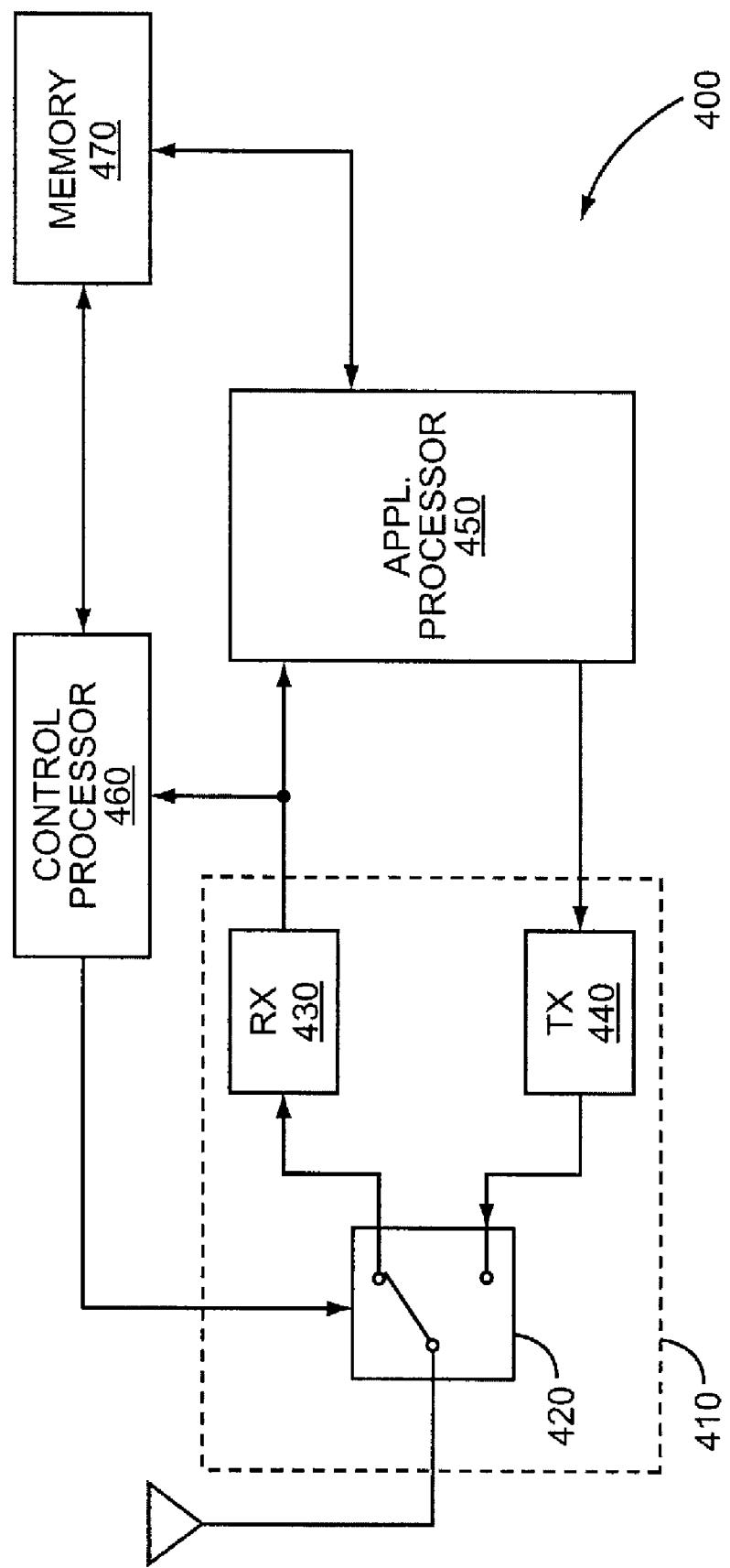
FIG. 4 is a block diagram illustrating an exemplary half-duplex mobile terminal according to some embodiments of the invention.

FIG. 4 illustrates a block diagram of part of a half-duplex mobile terminal 400 according to some embodiments of the present invention, including a radio transceiver 410, an application processor 450, and control processor 460. As pictured, the radio transceiver 460 is only capable of half-duplex operation, in that receiver 430 and transmitter 440 are connected to the antenna through a duplexing switch 420, rather than through a duplexing filter. The duplexing switch is controlled by a control processor 460, which selects between a transmit mode and a receive mode at appropriate times. Thus, receiver 430 and transmitter 440 cannot operate simultaneously.

Of course, those skilled in the art will appreciate that the embodiment pictured in FIG. 4 illustrates but one possible configuration of a half-duplex transceiver. In other embodiments, for example, a receiver and transmitter may each be connected to a separate antenna, in which case the controller may simply be configured to enable and disable transmitter and receiver circuitry at the appropriate times, to eliminate self-interference and to reduce power consumption. Other embodiments may exploit two or more antennas for multi-antenna transmission and/or multi-antenna reception, for use with interference cancellation and/or spatial multiplexing techniques.

Those skilled in the art will appreciate that radio transceiver 410 may correspond to only one communications standard and/or frequency band out of two or more standards or frequency bands supported by mobile terminal 400. Thus, mobile terminal 400 may in some embodiments include one or more additional radio transceiver circuits that are not shown, some of which may support full-duplex operation in a corresponding wireless communication network. Of course, those skilled in the art will also appreciate that various circuits and features of mobile terminal 400 that are necessary to its operation and/or desirable to a user are not illustrated in the block diagram of FIG. 4; rather, only those components necessary to a full understanding of the present invention are pictured.

In some embodiments of the invention, the fact that the mobile terminal 400 supports only half-duplex operation is signaled to the base station. This may occur during the mobile terminal's initial access to the system. In response to a request for system resources, e.g., during a connection set-up or similar radio resource control communication, a number of uplink and downlink subframes allocated to the mobile terminal 400 per super-frame and/or a specific allocation of uplink and downlink subframes is signaled to the mobile terminal 400 by the serving base station. The quantity of resources allocated may be determined by the current service or services requested by the mobile terminal 400, as well as system considerations such as the current loading of the serving cell.

In some embodiments of the invention a "hopping pattern," designating a varying pattern of uplink and downlink resource allocations, is signaled to the mobile terminal. In some embodiments, for example, a resource allocation message provided to the mobile terminal may completely define a repeating pattern of uplink and downlink subframes applicable to a series of frames. In other embodiments, a resource allocation message may instead designate one of several pre-determined patterns "known" to the mobile terminal 400, e.g., stored in a lookup table in memory 470. In either case, the specific allocation of uplink and downlink subframes may vary from one frame (or super-frame) according to the designated pattern. Hence, a hopping pattern is defined for a given number of uplink/downlink subframes per frame. For instance, given that two uplink subframes and two downlink subframes are needed per frame, where each frame includes ten uplink subframes and ten downlink subframes, numbered "0" through "9," one pre-determined pattern of subframe allocations could be as follows: downlink—0 & 1, uplink—2 & 3 in first frame; downlink—1 & 2, uplink—3 & 4 in second frame; and so on, until downlink—9 & 0, uplink—1 & 2 in the tenth frame. The pattern may then start over again.

In the preceding example, the number of uplink and downlink subframes remained constant for each frame, and at least one uplink allocation and one downlink allocation was changed between consecutive frames. Of course, various hopping patterns are possible in which, for example, the allocations vary every second or third frame, the total number of subframes allocated varies between some frames, or in which the allocated uplink subframes or the allocated downlink subframes, but not both, are changed on a per-frame basis.

In order to have randomized behavior between mobile terminals, thus reducing the risk of terminal-to-terminal interference, in some embodiments an arbitrary starting point within a pre-determined pattern may be selected and signaled to the mobile terminal. In some cases, this starting point may be chosen randomly by the serving base station for each served mobile terminals. In others, different starting points within the same pre-determined pattern may be selected by the base station to ensure a lack of interference between two (or more) particular terminals. Thus, for example, the pattern described above could be assigned to each of two mobile terminals, but the starting points designated so that one mobile terminal starts at the beginning of the pattern while the other starts near the middle. In one case, for example, when the first mobile terminal is assigned uplink subframes 2 & 3, the second mobile terminal may be assigned downlink subframes 7 & 9. As the two mobile terminals step through the pattern, in this example, it is assured that neither will transmit in a subframe during which the other terminal is receiving data.

Those skilled in the art will appreciate that two or more mobile terminals may be assigned to the same uplink and/or downlink subframes, in some systems. For example, in LTE systems, multiple mobile terminals share wide-band frequency resources according to Orthogonal Frequency-Division Multiple Access and Single-Carrier Frequency-Division Multiple Access schemes, for the downlink and uplink, respectively. In these systems, a lack of interference between two or more half-duplex terminals may be ensured by providing these terminals with identical allocations of uplink and downlink subframes.

In any case, referring once more to FIG. 4, information on uplink and downlink subframe allocation and an allocation hopping pattern is received by the mobile terminal 400 as a control message, via receiver 430, and control processor 460 utilizes that information to control switching, at switch 420, between uplink transmission and downlink reception. In some embodiments, the connection between the terminal and network continues according to the allocated pattern until or unless new control information is received.

In another embodiment of the invention, a half-duplex mobile terminal, such as mobile terminal 400, is connected to a wireless network and has been allocated a certain number of uplink and downlink frames per frame according to a well defined, but fixed (i.e., non-hopping) pattern. For example, this fixed pattern might be the pattern illustrated in FIG. 1, in which the same combination of two uplink subframes and two downlink subframes is allocated to the mobile terminal in each of a series of frames. In this embodiment, the mobile terminal monitors the signal quality of the received signals, e.g., by calculating a signal-to-interference ratio (SIR) based on the signals received during the allocated downlink subframes. This signal quality information may be fed back to the base station, according to well-known techniques, and used by the serving base station for adapting the coding and modulation scheme, determining when a handover is appropriate, etc. By monitoring the signal quality, however, a control processor in the mobile terminal may also detect a downlink quality problem, which might appear as a sudden degradation of the SIR in some or all of the allocated downlink subframes. This particular change in signal quality might indicate a terminal-to-terminal interference problem. Accordingly, in response to detecting the quality problem, the mobile terminal transmits a request for another uplink/downlink allocation pattern to the base station. The message is received by the wireless network and an allocation message is sent to the mobile terminal indicating a new or updated uplink/downlink allocation pattern. The wireless connection is then continued using the new uplink/downlink allocation.

Figure 8:
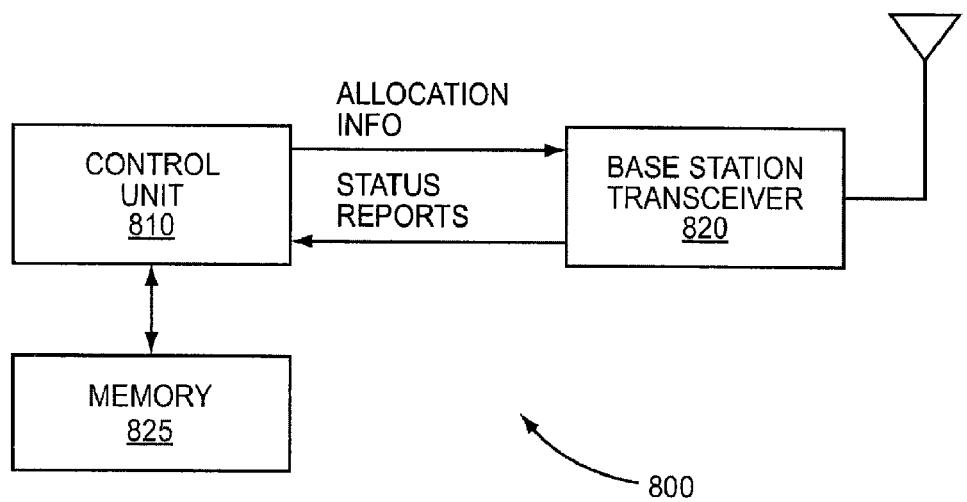
FIG. 8 is a block diagram illustrating an exemplary base station according to some embodiments of the invention.

In yet other embodiments of the invention, a base station is configured to serve several mobile terminals, including one or more half-duplex mobile terminals. A block diagram of an exemplary base station 800 is illustrated in FIG. 8. In these embodiments, a control unit 810 in the base station detects a quality problem for a served mobile terminal. A signal quality problem might, for instance, be detected from sudden changes in signal quality as indicated by status reports (e.g., SIR reports) received from the served mobile terminals via a base station transceiver 820. If the status reports indicate a signal quality problem applicable to only some downlink subframes for a particular mobile terminal, or if the status reports indicate a sudden change in signal quality for allocated downlink subframes for a particular mobile terminal, then the control unit 810 may conclude that the problem is likely to be caused by terminal-to-terminal interference. In this event, the control unit 810 may select a new uplink/downlink allocation pattern for one or more of the served mobile terminals, from one or more pre-determined patterns stored in memory 825, for example, and transmit corresponding allocation messages to the re-scheduled terminals via the base station transceiver 820. Those skilled in the art will appreciate that a re-allocation of uplink/downlink resources may be directed to the affected mobile terminal, i.e., the mobile terminal with the received signal quality problem, to move the mobile terminal's allocated downlink subframes away from an interfering transmission. Alternatively, a reallocation message may be sent to a mobile terminal judged to be the source of the interfering transmission, to move the interfering transmissions to other subframes. Of course, a combination of both approaches might also be used.

In some embodiments, the control unit 810 at the base station 800 may detect particular problem scenarios, and thus determine that interference between two (or more) particular mobile terminals has occurred or is likely. For example, by comparing scheduling information, time alignment values, signal quality reports, and the like, the base station control unit 810 may determine that two half-duplex mobile terminals are connected to the serving base station, are transmitting similar SIR values, and have similar timing alignment (i.e. radio signal propagation delay), such that a transmission for one half-duplex mobile terminal coincides with reception at another half-duplex mobile terminal. This indicates that the two mobile terminals are likely too close to each other, and hence at risk for terminal-to-terminal interference. In this case, a new uplink/downlink subframe allocation pattern is sent to at least one of the mobile terminals and communication is continued using the new uplink/downlink subframe allocation pattern.

Since terminal-to-terminal interference may be generated by a half-duplex mobile terminal not having a duplex filter, a downlink quality problem in some subframes might also occur in full-duplex terminals. For example, transmissions from a half-duplex mobile terminal might interfere with downlink transmissions to a nearby full-duplex mobile terminal. Hence, the scheduling techniques discussed above may be applied to either half-duplex terminals or full-duplex terminals, if downlink signal quality problems in some downlink subframes to a particular terminal are detected and/or are likely to occur.

Figure 5:
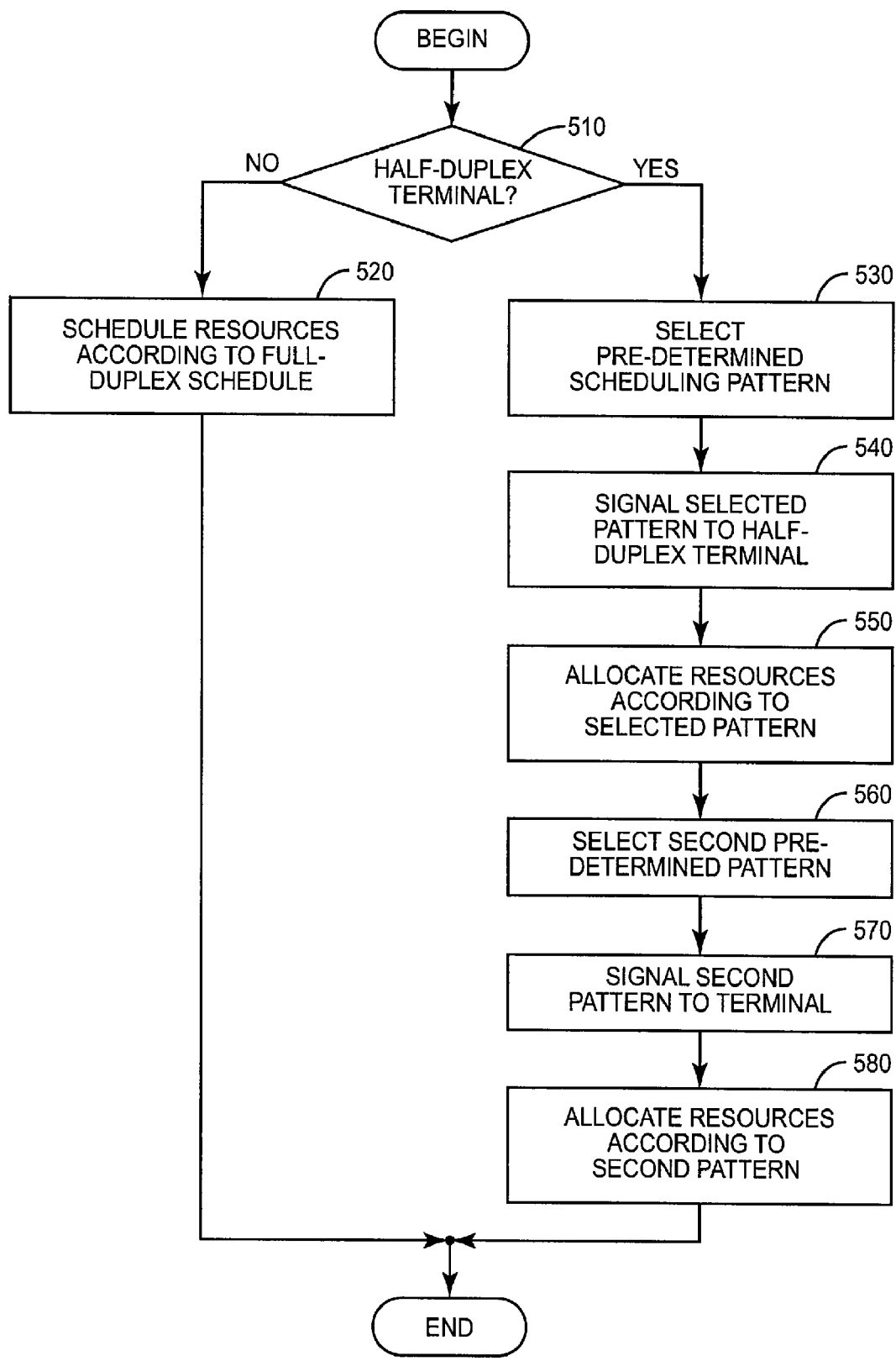
FIG. 5 is a flow diagram illustrating an exemplary method for allocating uplink and/or downlink resources in a wireless communication system supporting full-duplex and half-duplex mobile terminals.
Figure 6:
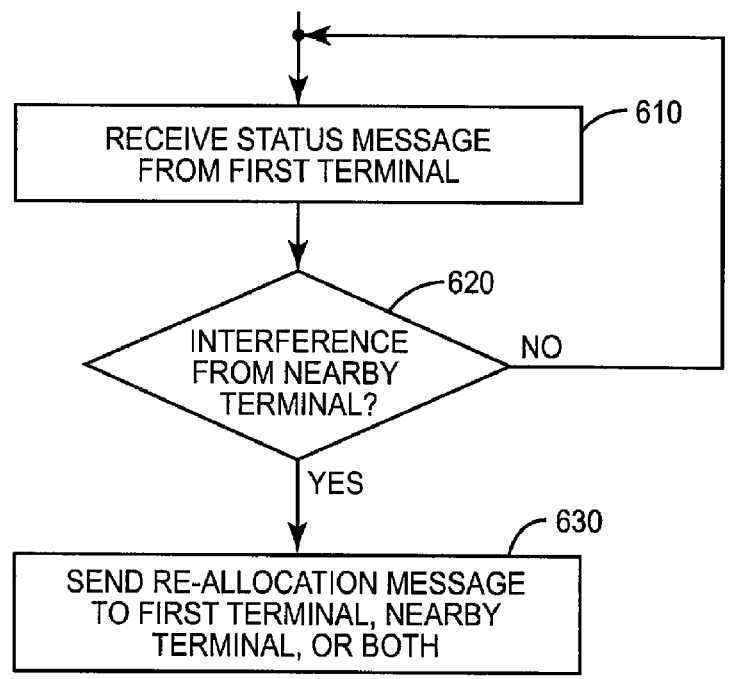
FIG. 6 is a flow diagram illustrating an adjustment of uplink and/or downlink resource allocations based on the detection of interference, according to some embodiments of the invention.
Figure 7:
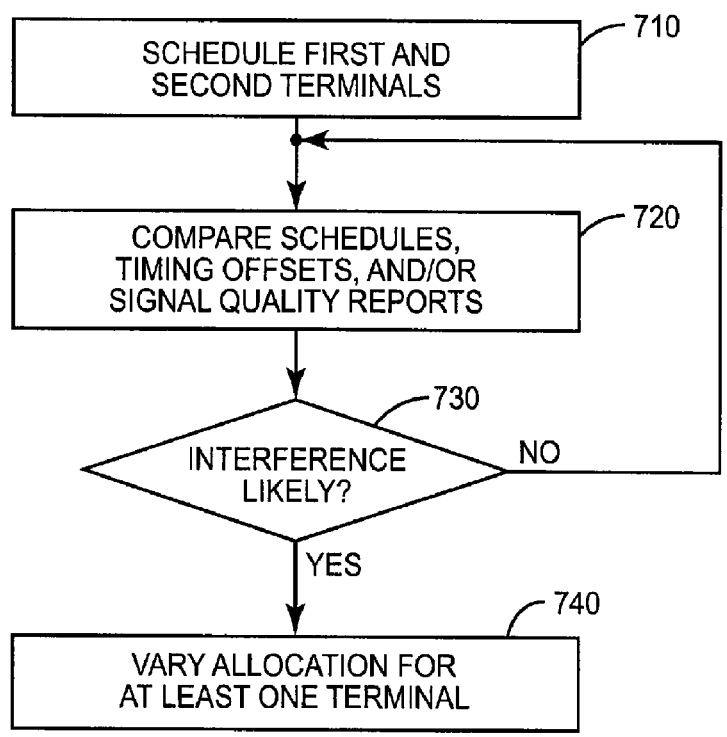
FIG. 7 is a flow diagram illustrating another exemplary method for allocating uplink and/or downlink resources.

With the above discussion of various mobile terminal and base station configurations in mind, those skilled in the art will appreciate that the process flows illustrated in FIGS. 5, 6, and 7 illustrate embodiments of various methods for allocating uplink and downlink timeslots in a wireless communication system supporting both full-duplex and half-duplex mobile terminals. Of course, those skilled in the art will understand that these process flows are presented for illustration, and are not intended to be limiting; variations falling within the scope of the claimed invention are possible.

In FIG. 5, a method for allocating uplink and downlink timeslots in a wireless communication system using the "hopping" pattern approach is presented. The illustrated process might be implemented in an LTE base station, for example, or in any of a variety of wireless systems that support both full-duplex and half-duplex mobile terminals. The pictured process flow begins at block 510, with a determination of whether a particular mobile terminal is capable of full-duplex or half-duplex operation. If the mobile terminal supports full-duplex operation, then the mobile terminal is allocated resources according to conventional full-duplex scheduling processes, as shown at block 520. In short, because it is capable of simultaneous transmission and reception, the mobile terminal may be allocated uplink and downlink subframes without regard to whether any of the allocated uplink subframes overlap in time with a downlink subframe.

On the other hand, if the mobile terminal is a half-duplex terminal, the scheduling must account for the fact that the mobile terminal cannot simultaneously transmit and receive. Further, the possibility that the mobile terminal might cause interference to nearby terminals and/or be susceptible to interfering with nearby terminals may be taken into consideration. Hence, as shown at block 530, a first pre-determined scheduling pattern is selected, in which one or more independently allocable uplink and downlink subframes are allocated to the mobile terminal so that none of the allocated uplink subframes overlaps in time with any of the allocated downlink subframes. Further, the pre-determined scheduling pattern defines a variation of the allocation of uplink subframes and downlink subframes between successive ones in a series of frames. This pattern may repeat itself after several frames, as discussed earlier.

The selected pattern is then signaled to the half-duplex terminal, as shown at block 540; this signaling may comprise an allocation message that specifies the quantities of allocated uplink and downlink subframes as well as a particular hopping pattern. The pattern itself may be completely specified in the allocation message, according to a pre-determined code, or the allocation message may simply comprise an index or similar indicator used by the mobile terminal to select one of a plurality of pre-determined patterns. For instance, the mobile terminal may include a memory configured with a look-up table comprising several pre-determined patterns retrievable according to a pre-determined indexing scheme. In these embodiments, for example, the allocation message from the base station may simply indicate that a pattern corresponding to a particular index should be used.

In any case, after signaling the selected pattern to the half-duplex terminal, the base station allocates resources to the mobile terminal according to the selected pattern, as shown in block 550. Accordingly, downlink data is sent to the mobile terminal on scheduling downlink subframes that may vary from one frame to the next, per the selected pattern. Similarly, uplink data is received from the mobile terminal on the scheduled uplink subframes. Those skilled in the art will appreciate that the scheduling pattern assigned to the half-duplex mobile terminal should be considered by the base station in allocating resources to other mobile terminals, to avoid scheduling conflicts. Further, as was discussed above, scheduling patterns may be coordinated between one or more mobile terminals to eliminate or mitigate terminal-to-terminal interference.

The scheduling of resources according to the assigned pattern may continue indefinitely, in some circumstances. In others, however, it may be desirable to occasionally change the scheduling pattern. For example, it may become necessary to change the scheduling pattern to eliminate a detected or predicted interference problem or to respond to changing load conditions at the base station. Accordingly, a second pre-determined pattern may be selected, as shown at block 560, and signaled to the mobile terminal, as shown at block 570. As indicated at block 580, scheduling of resources then proceeds according to the newly selected pattern.

As suggested above, a re-allocation of resources may be triggered by the detection of interference at one or more mobile terminals. A process flow corresponding to one approach to re-allocating resources is pictured in FIG. 6. At block 610, a status message is received from a first mobile terminal. In some circumstances, the status message, which may include signal quality data such as one or more SIR reports corresponding to allocated downlink subframes, may indicate that excessive interference is present in one or more downlink subframes. In some cases, the receiving base station may detect this problem by comparing received signal quality data with previously received reports. In this manner, sudden changes in signal quality may be detected, indicating a possible terminal-to-terminal interference problem. In other cases, the mobile terminal may be configured to determine that excessive interference has occurred, in which case the status message may include an explicit indication of the excessive interference, or even an express request for a re-allocation of resources.

In any event, if interference from a nearby terminal is not detected, as shown at block 620, then the current allocation of resource continues, along with the continued monitoring of status messages from the mobile terminal. If interference is detected, however, then a re-allocation message is sent to the affected mobile terminal, as shown at block 630. Alternatively, as further indicated at block 630, a re-allocation message may be sent to the interfering terminal, if the identity of the interfering terminal is known or can be deduced. Of course, a re-allocation message may be sent to both terminals in some embodiments.

Those skilled in the art will appreciate that the technique generally illustrated in FIG. 6 may be applied to allocation schemes employing the hopping patterns discussed above, or to modify fixed allocations of uplink and downlink subframes. Further, these allocation adaptation techniques may be applied to the scheduling of full-duplex mobile terminals as well as half-duplex mobile terminals.

The same is true for the techniques illustrated in FIG. 7, which describes a process for detecting likely interference between two particular mobile terminals. At block 710, first and second mobile terminals are scheduled, using fixed allocation patterns or hopping allocation patterns. At block 720, a control unit in the scheduling base station compares one or more of the schedules for the two mobile terminals, timing offsets for the terminals, and/or signal quality reports received from the terminals. In practice the first and second mobile terminals may be two of many mobile terminals currently served by the base station; FIG. 7 thus illustrates but one instance of numerous pair-wise comparisons that may be carried out by the base station in some embodiments to analyze potential interference scenarios for each possible pair of mobile terminals. Based on this comparison, the control unit can predict whether interference is likely to occur. For instance, if the schedules for two mobile terminals overlap, and the respective timing offsets and SIR reports are similar, the control unit might conclude that the two terminals are likely to be in the same area, and are at risk for interfering with one another. If interference is predicted, as shown at block 730, then the allocation for at least one of the terminals is varied, as shown at block 740. Otherwise, the monitoring of schedules, timing offsets, and/or signal quality reports continues.

Figure 9:
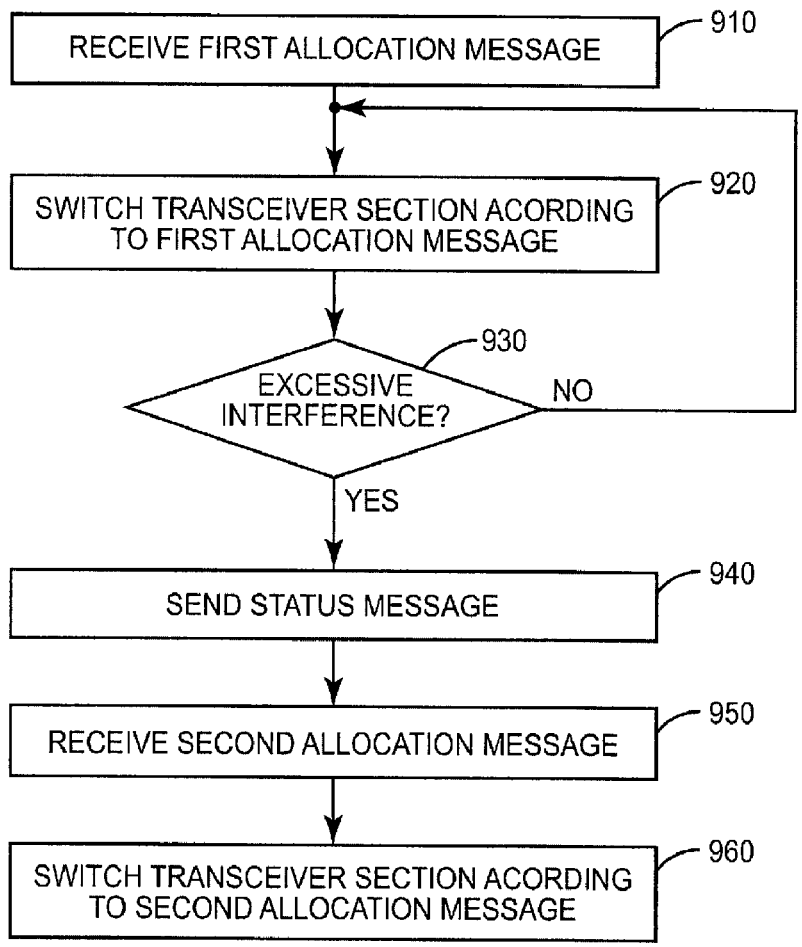
FIG. 9 is a flow diagram illustrating an exemplary method for controlling a half-duplex mobile terminal.

As discussed above, the processes illustrated in FIGS. 5, 6, and 7 may be implemented in the fixed portion of a wireless communication system supporting both full-duplex and half-duplex mobile terminals, such as in a base station (or "eNodeB") of an LTE system. Corresponding methods may be implemented at the mobile terminals, for receiving and processing the allocation messages from the base station. One such method is illustrated in FIG. 9.

As pictured at block 910, a first allocation message is received from the base station. This allocation message designates an allocation of uplink and downlink subframes, which may comprise a hopping pattern, as discussed above, or an allocation that doesn't vary between frames. At block 920, a control processor in the receiving mobile terminal controls a transceiver section according to the first allocation of resources. As discussed above, this may include switching a duplex switch selectively connecting one or more antennas to the receiver and transmitter portions of the mobile terminal. This may also include enabling and disabling portions of the transmitter and receiver circuits at the appropriate times, to avoid self-interference and/or to minimize power consumption.

As shown at block 930, the mobile terminal may be configured to monitor the downlink subframes for excessive interference. In some embodiments, this may include determining the SIR for downlink subframes and comparing to previously measured SIRs. As noted above, a sudden change in SIR for one or more allocated downlink subframes may indicate that a nearby mobile terminal, which may lack a duplexing filter, is causing interference.

If excessive interference is not detected, the mobile terminal continues to communicate with the base station using the previously signaled allocation pattern. If excessive interference is detected, on the other hand, the mobile terminal may be configured in some embodiments to transmit a status message to the base station, as shown at block 940. In some instances the status message may include SIR data or other signal quality data. In some embodiments, the status message may include a report that explicitly indicates that excessive interference was detected, and/or an express request for a re-allocation of resources. In response, the mobile terminal receives a second allocation message designating a new allocation of uplink and downlink subframes, as shown at block 950. The second allocation message is used by the control processor to control the transceiver section, e.g., to switch a duplex switch at the appropriate times.

In the preceding discussion, various embodiments have been described in the context of half-duplex mobile terminals operating in full-duplex cellular systems. Similar techniques may also be extended to Time Division Duplexing (TDD) systems. However, in a TDD system, the uplink and downlink take place on the same carrier frequency. In order to have a highly efficient TDD cellular system, all base stations using the same carrier frequency should preferably be synchronized, transmitting and receiving at the same time. However, adjacent TDD channels (whether geographically adjacent or frequency-adjacent, or both) that are not synchronized may give rise to terminal-to-terminal interference problems. The problem of terminal-to-terminal interference between adjacent TDD carriers may be reduced using techniques similar to those described above. In particular, the use of hopping allocation patterns described may be particularly useful in TDD, since for TDD all mobile terminals on the carrier are constrained to the same uplink and downlink subframes. However, variations of the other techniques described above are also possible. For instance, a first-predetermined hopping pattern may be replaced by a second pre-determined hopping pattern in the event that excessive interference at one or more mobile terminals is detected or predicted. Similarly, a static TDD arrangement may be changed in response to the detection or prediction of interference. In each of these cases, signaling information about the updated uplink/downlink allocations may be sent to all the mobile terminals on the carrier.

With these and other variations and extensions in mind, those skilled in the art will appreciate that the preceding descriptions of various embodiments of methods and apparatus for allocating uplink and downlink timeslots in a communication system are given for purposes of illustration and example. Those skilled in the art will appreciate, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of allocating uplink and downlink timeslots in a wireless communication system supporting full-duplex and half-duplex mobile terminals, the method comprising:
    for each frame in a first series of frames, assigning a first fixed allotment of one or more uplink subframes and one or more downlink subframes to a first mobile terminal;
    detecting that excessive interference in at least one of the allocated downlink subframes is likely or has occurred;
    responsive to said detecting, assigning a second fixed allotment of uplink and downlink subframes to the first mobile terminal for use in a second series of frames, wherein at least one allotted downlink subframe differs from the first fixed allotment; and
    wherein detecting that excessive interference in at least one of the allocated downlink subframes is likely or has occurred comprises predicting that interference to the first mobile terminal from a second mobile terminal is likely by comparing one or more of scheduling information for the first and second mobile terminals, time alignment values for the first and second mobile terminals, and signal quality reports from the first and second mobile terminals.

2. The method of claim 1, wherein detecting that excessive interference in at least one of the allocated downlink subframes is likely or has occurred is based on received signal quality reports from the first mobile terminal.

3. The method of claim 1, further comprising transmitting first and second allocation messages to the first mobile terminal, the first and second allocation messages designating the first and second fixed allotments, respectively.

4. A base station for use in a wireless communication system supporting full-duplex and half-duplex mobile terminals, the base station comprising a control unit configured to:
    for each frame in a first series of frames, assign a first fixed allotment of one or more uplink subframes and one or more downlink subframes to the first mobile terminal;
    detect that excessive interference in at least one of the allocated downlink subframes is likely or has occurred;
    responsive to said detection, assign a second fixed allotment of uplink and downlink subframes to the first mobile terminal for use in a second series of frames, wherein at least one allotted downlink subframe differs from the first fixed allotment; and
    wherein the control unit is configured to detect that excessive interference in at least one of the allocated downlink subframes is likely or has occurred by predicting that interference to the first mobile terminal from a second mobile terminal is likely by comparing one or more of scheduling information for the first and second mobile terminals, time alignment values for the first and second mobile terminals, and signal quality reports from the first and second mobile terminals.

5. The base station of claim 4, wherein the control unit is configured to detect that excessive interference in at least one of the allocated downlink subframes is likely or has occurred based on received signal quality reports from the first mobile terminal.

6. The base station of claim 4, further comprising transmitting first and second allocation messages to the mobile terminal, the first and second allocation messages designating the first and second fixed allotments, respectively.

* * * * *